United States Patent [19]

Amann

[11] 3,865,935

[45] Feb. 11, 1975

[54] TABLETING OF ERYTHROMYCIN BASE

[75] Inventor: Anton Helmuth Amann, Waukegan, Ill.

[73] Assignee: Abbott Laboratories, North Chicago, Ill.

[22] Filed: Aug. 10, 1972

[21] Appl. No.: 279,600

[52] U.S. Cl. .................................. 424/181, 424/16
[51] Int. Cl. ............................................ A61k 21/00
[58] Field of Search ............................. 424/181, 80

[56] References Cited
UNITED STATES PATENTS 2,798,024  7/1957  Zapapas et al...................... 424/21
2,857,312  10/1958  Stephens............................ 424/181

Primary Examiner—Henry A. French
Attorney, Agent, or Firm—Paul D. Burgauer; Robert L. Niblack

[57] ABSTRACT

The present invention is directed to a new tableting formulation for compounding of erythromycin base. It is particularly directed to a new oral dosage form of erythromycin base which is stable upon storage but released promptly in the acidic environment of the stomach.

8 Claims, No Drawings

TABLETING OF ERYTHROMYCIN BASE

DETAILED DESCRIPTION OF THE INVENTION

In the past, erythromycin base has been difficult to incorporate into stable oral administration forms because it is, per se, rather unstable in the acidic environment of the stomach, has an objectionable taste and for that reason, it has always been formulated as an enteric coated tablet. Non-enteric tablets have not been known because of the poor stability of erythromycin base. Enteric coated tablets, on the other hand, are unsuitable when fast onset of action is desired. In addition, enteric coatings are not desirable because of variations in stomach emptying time between patients and depending on food ingested.

It is therefore an object of the present invention to provide an oral dosage form of erythromycin base; it is a further object of this invention to produce a stable, nonenteric coated oral dosage form for erythromycin base; it is a further object of this invention to provide an oral dosage form for erythromycin base that produces a prompt high erythromycin blood level in the patient to whom such a dosage form is administered.

These and other objects are accomplished by providing a non-enteric erythromycin base composition for oral administration consisting essentially of a) erythromycin base granules prepared in known fashion using at least one disintegrating agent, one granulating agent and a buffer, each component being soluble or dispersible in water or acidic environments, b) sodium citrate, c) a disintegrating agent or agents and d) a lubricating agent or agents and, if desired, binders, flavoring and/or coloring agents, compressed into an oral dosage unit form. The new composition is prepared by making granules of erythromycin base with the aid of the usual granulating and disintegrating agents and buffers, combining the performed granules of a mesh size below 12 with the above-named excipients and, if desired, with flavoring or coloring agents, compounding this mixture in a ratio of 40–150 parts excipients per 100 parts of erythromycin base granules, and preparing a solid dosage unit therefrom.

One component of the composition of the present invention is erythromycin base granules. Such granules are preferably prepared from erythromycin base together with a disintegrating agent, a water-soluble binder and a buffer or combination of buffering agents. Among the disintegrating agents, microcrystalline cellulose is preferred, although starch, methylcellulose, carboxy methylcellulose, talcum powder and others may be used in place thereof. As binder, poly(vinylpyrrolidone) or hydroxypropylmethylcellulose are the most commonly used materials, although starch paste or poly(vinylalcohol) may be used in its place. The granules are ordinarily buffered by a standard buffer or buffer system; an excellent combination serving this purpose is sodium hydroxide or potassium hydroxide together with potassium phosphate or sodium phosphate. In any event, the required materials have to be selected in such a way that the combination readily dissolves or disperses in water or an acidic environment such as gastric juice or artificial gastric juices.

By mixing the above named ingredients in a ratio of 5 to 20 parts of binder, 12 to 35 parts of a disintegrating agent, 0 to 0.16 parts of sodium hydroxide and 0 to 0.8 parts of potassium phosphate per 100 parts of erythromycin base, a hard granule is obtained, when processed in the usual fashion. These granules are passed through a 12 mesh screen to remove agglomerates with a diameter larger than 1600 microns. After drying, the above granules are thoroughly mixed with 40–160 parts of anhydrous sodium citrate (or the molar equivalent amount of a sodium citrate polyhydrate), 2 to 20 parts of a disintegrant and 0.4 to 3.6 parts of a lubricant per 100 parts of granules. Any of the commonly known lubricants may be used for this purpose, e.g., starch, stearic acid, talcum powder and calcium stearate. After thoroughly mixing, the blend is tableted in usual fashion. If desired, binders, coloring or flavoring agents can be admixed with the compounding of the granules or, alternately, the tablets prepared from the above mixture can be coated with a usual coating solution to make elegant, colored or pigmented tablets, chewable tablets or other oral dosage forms. Of course, such a coating solution must be free of insoluble or non-dispersible enteric coating materials; it must consist of a combination of materials that readily dissolve or disperse in gastric juices.

By the process described above, a non-enteric formulation is produced which has unexpected high stability as an oral dosage form. This formulation produces an unusually high erythromycin blood level shortly after being ingested by a patient.

In order to illustrate the process of the present invention, reference is made to the following examples which, however, are not meant to limit the invention in any respect. All "parts" are intended to refer to parts by weight unless indicated otherwise.

EXAMPLE 1

| | |
|---|---|
| Erythromycin Base (U.S.P. Special) | 250 parts |
| Poly(vinylpyrrolidone) | 35 parts |
| Microcrystalline cellulose | 35 parts |
| Sodium hydroxide U.S.P. | .36 parts |
| Potassium phosphate | 1.32 parts |

These ingredients are throughly blended and granulated with 0.1 parts of water. The granules were then dried and passed through a 12-mesh screen. The dry granules were then combined with the following additives:

| | |
|---|---|
| Erythromycin Base granules from above | 320 parts |
| Sodium citrate dihydrate | 300 parts |
| Amberlite IRP-88* | 15 parts |
| Magnesium stearate | 3 parts |

*a cationic ion exchange resin made from methacrylic acid/divinylbenzene copolymer, marketed by Rohm and Haas Co.

After thoroughly blending these ingredients, the mixture was tableted in the usual fashion using a high speed rotary tablet machine, with ovaloid punches 1.2 cm, in its longer diameter to prepare tablets containing 250 mg. erythromycin base. These tablets produce the expected antibacterial action but distinguish from other erythromycin tablets by producing onset of action immediately upon disintegrating in the stomach.

When the sodium citrate dihydrate used above was replaced by an equimolar amount of anhydrous sodium citrate, the same stability and antibacterial effect was produced. However, when the sodium citrate was incorporated into the granulation formula, the resulting tablets showed a much lower antibacterial effect.

EXAMPLE 2

The bioavailability of tablets made according to the process of Example 1 was studied in adult human volunteers. All tablets contained 250 mg. of erythromycin base but varied in amount and kind of sodium citrate. The following table shows the results obtained in 3- and 8-hours bioavailability studies on non-fasting subjects ingesting a single tablet:

TABLE

| Tableted With Sodium Citrate | Number of Subjects | Number of non-Absorbers | Area Below Curve 3 hours | 8 hours |
| --- | --- | --- | --- | --- |
| 400 mg dihydrate powder | 16 | 2 | 0.98 | 1.87 |
| 300 mg dihydrate powder | 7 | 2 | 1.02 | 2.20 |
| 400 mg dihydrate granular | 8 | 1 | 0.47 | 1.29 |
| 100 mg dihydrate granular | 8 | 1 | 0.46 | 1.16 |
| 350 mg anhydrous powder | 8 | 2 | 0.67 | 1.21 |
| none | 8 | 2 | 0.32 | 0.51 |
| 400 mg dihydrate in granules | 7 | 3 | 0.23 | 0.59 |

The above table shows the prompt onset of action of the new composition and the high blood level attained with the new tableting additive. This is expressed by the columns marked "Area Below Curve" which is a surface area measurement from the time/blood level curve between the curve and the zero blood level axis. The figures are only useful in comparison to other dosages administered in the same fashion and plotted on the same graph.

When the Amberlite of the above tablet is replaced by the same amount of starch, essentially the same results are obtained.

The above table particularly shows a sharp contrast between tablets made according to the present invention and tablets made where the sodium citrate was present in the granules (last line of table) instead of being applied in the tableting procedure according to the present method. The values obtained in the absence of the sodium citrate further demonstrate the necessity of this additive. This was further substantiated by comparison of the above tablets with commercial erythromycin preparations, e.g., a 250 mg. tablet marked as E-Mycin by The Upjohn Co. of Kalamazoo, Mich., and a 250 mg. tablet marketed as Ilotycin by Eli Lilly & Co. of Indianapolis, Ind. Both of these tablets produced a zero value in the 3 hour area-below-curve while the 8 hour values were only 0.99 and 0.90, respectively. Also, the number of non-absorbers with these commercial tablets was significantly higher, i.e., 2 in 5 (40%) and 3 in 5 (60%), respectively, while the present tablets are not absorbed by 0-25% of the patient.

Also substantiated by the above experimentally established figures is the greatly improved stability of the tablets of the present invention: when sodium citrate is not present in the lubricating step (completely absent or present only inside the granules), the "area-below-curve" figures prove to be significantly lower. In the 3-hour tests, the last two "control" tablets show only 25 and 35% of the value averaged from the figures obtained with the powdered sodium citrate in the lubricating step; the 8-hour values are 28.5 and 33%, respectively. This finding shows a significant loss of antibiotic strength associated with tablets made according to prior methods due to degradation in the acidic environment of the stomach.

Although the use of sodium citrate as a component in tableting formulations is not new, the present invention clearly shows that this material is necessary to obtain good early blood levels and must be applied in the lubricating step where erythromycin base tablets are concerned, rather then being a part of the granulation formulation. The ratio of erthromycin to sodium citrate is preferably selected between 1:0.4 and 1:2 with best results being attained at ratios between 1:0.8 and 1:1.6 on a weight basis. While these figures are based on sodium citrate dihydrate, anhydrous sodium citrate may be substituted therefor at an equimolar base. In any formulation, it is also preferred to use powdered crystalline sodium citrate, although granular material also shows the unexpected improvement of the present invention over previous formulations.

The tablets made by the process of the present invention may, of course, be coated in the standard fashion known from the prior art for non-enteric dosage. A suitable coating formulation may be prepared according to the teaching of U.S. Pat. No. 2,881,085 or other publications showing suitable coating methods which do not interfere with the immediate release of the active drug. Such a formulation may contain the usual flavoring or coloring agents. In practice, about 300 ml. of fluid coating mixture is used per kilogram of tablets.

The new dosage formulation is extremely stable under normal storage conditions: no loss of erythromycin strength is detectable in 9 months of shelf life. In addition, the new formulation is relatively stable at a pH below 2 such as that in the stomach while previously known erythromycin formulations promptly lose a considerable amount of antibacterial activity in such an environment. For this reason, the erythromycin base formulations of the prior art all had to be protected by an enteric coating to assure that such tablets pass through the stomach unharmed. This, in turn, produced a delayed onset of action which is overcome by the tablets of the present invention.

As shwon in the above example, the tableting step to which this invention is directed, does not require the use of a binder, although such a component may be used optionally. Usually, the binder present in the granules is sufficient for the tableting step according to this invention

I claim:

1. The process of making a solid non-enteric erythromycin dosage form for oral administration consisting essentially of thoroughly mixing a) erythromycin granules containing erythromycin base and pharmaceutically acceptable excipients readily soluble or dispersible in water or acidic environments, b) anhydrous sodium citrate or sodium citrate dihydrate, c) at least one lubricating agent and d) at least one disintegrating agent and tableting said mixture into a unit dosage form.

2. The process of claim 1 wherein said erythromycin granules and said sodium citrate are used in a ratio between 1:0.4 and 1:2 based on anhydrous sodium citrate.

3. The process of claim 2 wherein said ratio is between 1:0.8 and 1:1.6.

4. The process of claim 1 wherein said unit dosage form also contains at least one flavoring agent and at least one coloring agent.

5. The process of claim 4 wherein said tablet contains erythromycin base and sodium citrate in a ratio of between 1:0.8 and 1:1.6.

6. The process of claim 4 wherein said sodium citrate is used in the form of crystalline powder.

7. The process of claim 1 wherein said mixture also contains a binder.

8. The process of claim 1 wherein said tablet is subsequently coated with a non-enteric, pharmaceutically acceptable coating solution.

* * * * *